Patented Sept. 25, 1945

2,385,484

UNITED STATES PATENT OFFICE 2,385,484

PROCESS FOR THE PRODUCTION OF DIOLEFINS

Kenneth A. Wright, Oakland, Calif., assignor to Shell Development Company, San Francisco, Calif., a corporation of Delaware No Drawing. Application January 14, 1944, Serial No. 518,257

14 Claims. (Cl. 260—680)

This invention relates to an improved process for the production of diolefins by catalytic dehydrogenation characterized by the use of special catalysts and special high temperature conditions affording exceptionally high conversion and production capacity with excellent yield.

Primary objects of the invention are to provide an improved process for the production of diolefins, and particularly butadiene, by catalytic dehydrogenation wherein (1) exceptionally high conversions per pass may be realized, (2) substantially improved yields of butadiene may be obtained, (3) the production capacity of a given catalytic reactor is exceptionally high, (4) the dehydrogenation is carried out in the presence of a large excess of steam and the use of vacuum or fixed diluent gases is avoided, and (5) the dehydrogenation may be carried out with inexpensive catalysts which retain their activity over longer periods of time before requiring replacement.

The importance of diolefins, particularly butadiene, and the desirability of having improved methods for their production are well recognized. Considerable attention has been given in the past to the production of these valuable materials by catalytic dehydrogenation processes. Catalytic dehydrogenation to produce diolefins differs from most other dehydrogenation processes in requiring a low partial pressure of reactants in the reaction zone. Thus, it is necessary either to carry out the dehydrogenation under a substantial vacuum or to employ large quantities of a diluent. Operation under a vacuum is very costly. The use of inert diluents to decrease the partial pressure of the reactants usually makes the efficient separation and recovery of the diolefin from the product very difficult and is a serious disadvantage. Steam is an ideal diluent but, unfortunately, many of the most active dehydrogenation catalysts are poisoned by water vapors and steam cannot be employed as a diluent with them. Also, most of the catalysts are not sufficiently selective in their action and if steam is used as a diluent they catalyze the oxidation of the reactant by the steam, thus giving low yields. Also, the known catalysts lose their effectiveness in a relatively short period, particularly when steam is employed, and must be frequently replaced.

In order to produce diolefins by catalytic dehydrogenation using steam as a diluent it is necessary that temperatures above about 580° C. be used and that the catalyst be properly promoted with an alkali metal or its equivalent. Thus, as shown in copending application Serial No. 520,534, filed January 31, 1944, diolefins may be produced by catalytic dehydrogenation at temperatures above about 580° C. in the presence of an excess of steam with an alkalized iron oxide catalyst. The preferred alkali is an alkaline compound of potassium. In catalysts for dehydrogenation at high temperatures in the presence of steam an alkali metal promoter or its equivalent is essential since in its absence the catalyst loses its initial activity in a few minutes of use.

It has now been found that the promoting effects of the various alkali metal promoters in catalysts of this type, when used under these conditions, are by no means equivalent and that unexpected, different and greatly improved results are obtained if the catalyst is promoted with rubidium. Thus, by the simple substitution of rubidium for potassium the conversion per pass is approximately doubled; contrary to expectation, the selectivity is increased and the active life of the catalyst is increased. Thus, the production of a given diolefin in a given reactor in a given time is greatly increased, the production per pound of reactant is increased, and the production per pound of catalyst is increased. In view of the importance of the problem and the magnitude of the improvement realized, the present invention is considered to be an important advancement in the art.

The process of the invention, since it requires the use of very large amounts of steam and temperatures in the order of 600° C. or above, is applicable in such cases where these drastic conditions are required. Thus, the process can be advantageously applied for the production of styrene from ethyl benzene and for the production of cyclopentadiene from cyclopentane. The process is, however, particularly advantageous for the production of diolefins, and especially conjugated diolefins, from such mono-olefins as are capable of being vaporized and heated with steam to temperatures of at least 600° C. without substantial decomposition and contain at least four non-quaternary carbon atoms in a straight chain. Thus, the process is particularly advantageous for the production of such diolefins as butadiene, piperylene, isoprene, and the hexadienes. The olefin to be dehydrogenated may be a single hydrocarbon or, if desired, a mixture of olefins may be dehydrogenated to produce a mixture of diolefins. Also, in some cases a single diolefin may be produced from a mixture of isomeric olefins. For example, butadiene may be produced from either butene-1 or butene-2 or a mixture of the two, and isoprene may be produced from methyl ethyl ethylene, trimethyl ethylene, or isopropyl ethylene or a mixture of these olefins.

In order to facilitate the recovery of the diolefin and unconverted mono-olefin from the product and for various other practical reasons, its is usually desirable that the feed consist essentially of the desired olefin or mixture of olefins. This is, however, not essential and excellent results may be obtained using olefin fractions containing appreciable amounts of relatively inert materials. Thus, for example, in the production of butadiene a so-called butane-butylene fraction containing substantial amounts of butane may be used. Under the preferred conditions of operation the paraffin hydrocarbons are substantially unaffected and therefore act as inert diluents.

The catalysts which are applicable at high temperatures in the presence of large amounts of steam and which are employed in the process of the invention comprise as the primary active component a dehydrogenating oxide of a transition metal of the first transition series of the elements (i. e. Ti, V, Cr, Mn, Fe, Co and Ni). Of these, iron oxide is particularly effective and suitable, and nickel oxide is the least effective. These active dehydrogenating metal oxides may be present singly, in combination, or in combination with minor amounts of known stabilizing and/or promoting substances such as oxides of copper, zinc and silver. These metal oxides as well as their combinations are referred to hereinafter as the dehydrogenating metal oxide component of relatively high activity. The catalyst may consist of the dehydrogenating metal oxide of relatively high activity and the rubidium promoter, or it may contain minor or major amounts of a carrier, support, diluent or extender of relatively low catalytic activity. Thus, the dehydrogenating metal oxide of relatively high activity may be employed in combination with a difficultly reducible oxide of relatively low catalytic activity such, for instance, as an oxide of aluminum, silicon, zirconium or the like. These components may be in the form of intimate mixtures, for instance, mixed gels. In other cases the dehydrogenating metal oxide of relatively high catalytic activity may be incorporated in relatively minor amounts in the surface of a major amount of a relatively inactive support or carrier such as gels or mixtures of gels of silica, alumina, chromia, zirconia, etc., activated carbon, magnesia, diatomaceous earth, kieselguhr, bauxite, and the like. Also, these various materials of relatively low activity may be combined in mass with the relatively more active dehydrogenating metal oxide to serve as diluents or extenders. Preferred catalysts, however, consist largely of the dehydrogenating metal oxide of relatively high activity. Thus, a preferred group of catalysts contain at least 50% by weight and preferably about 70% to 95% of iron oxide.

The preparation of the catalysts with respect to the preparation of the dehydrogenating metal oxides and/or the combining of the dehydrogenating metal oxides with such diluent, extender, supporting or stabilizing materials may be effected in any of the conventional manners. Thus, the catalysts may be prepared in the wet way by precipitation methods or by slurry methods, or they may be prepared by thermal decomposition of suitable salts, or they may be prepared by the conventional impregnation methods.

The active dehydrogenating metal oxide or mixture of oxides, or mixture comprising one or more diluent or carrier materials, is promoted with the incorporation of a relatively small amount of a compound of rubidium. The rubidium may be incorporated into the catalyst during the preparation in the form of various rubidium compounds such, for instance, as the nitrate, sulfate, carbonate, hydroxide, oxide and the like. Very suitable and inexpensive rubidium salts are the rubidium alums. These various compounds are preferably converted at least in part to rubidium oxide during the preparation and/or use of the catalyst. Halides, when present in the catalyst, appear to exert a detrimental effect. Since traces of residual halide anions are difficult to remove from the catalyst, halide salts are not recommended in the catalyst preparation. The rubidium may be used alone as the promoter or it may be used in conjunction with one or more other alkali metal promoters such, in particular, as potassium and/or caesium. Thus, the rubidium promoter may be advantageously substituted in part by a potassium promoter. Very suitable mixtures of salts containing potassium and caesium as well as rubidium may be obtained from the working up of certain minerals such as certain lepidolites, certain carnallites, and certain porphyries containing rubidium. A very suitable material may be prepared, for example, from the crude mixture of salts of rubidium, caesium and potassium obtained from the mother liquors in the production of potassium salts.

The amount of rubidium required to produce the desired promoting effect is between about 0.8% and 5% by weight of the relatively active dehydrogenating metal oxide or mixture of metal oxides in the catalyst. This corresponds to between about 0.9% and 5.5% by weight of rubidium oxide. Thus, if the catalyst contains 50% by weight of a relatively inert diluent such as alumina, magnesia or the like, the concentration of rubidium in the total catalyst is between about 0.4% and 2.5%. If the rubidium is used in conjunction with potassium, the concentration may be decreased to about one-half these amounts.

The rubidium promoter may be incorporated into the catalyst at any suitable stage in the catalyst preparation. In catalysts which are pelleted or formed into pieces by extrudation or other means, the rubidium is preferably incorporated prior to such forming operation since catalysts of somewhat higher activity and longer life are thus obtained.

In order to maintain the proper state of oxidation of the dehydrogenating metal oxide and to maintain the catalytic activity, the process of the invention is carried out in the presence of a large excess of steam. Thus, the mol ratio of steam to hydrocarbon fed to the reaction zone is at least 2:1 and generally between about 7:1 and 30:1.

In order to obtain the desired results in the presence of a large excess of steam, the dehydrogenation is carried out at relatively high temperatures. Thus, the dehydrogenation is carried out at a temperature at least as high as 580° C. and generally between about 600° C. and 700° C. Somewhat higher temperatures may be employed but are usually unnecessary. A preferred method of operation affording high conversion efficiencies consists of adjusting the temperature initially to limit the conversion to, say, 35% or 40% and then increasing the temperature as the process continues to maintain this conversion. Thus, the process may be initiated with a fresh catalyst at a temperature of, say, 590° C. and the temperature gradually increases to, say, 670° C. during the life of the catalyst. By this method conversion efficiencies in the order of 70% to 90% may usually be maintained.

The dehydrogenation may be carried out under any pressure at which the steam and reactant exist in the reaction zone in the vapor state. Thus, either vacuum or pressure may be used. An important advantage of the process, however, is that excellent results may be obtained at atmospheric pressure.

In view of the exceptional activity of the described rubidium-promoted catalysts when used under the described conditions, the process of the invention allows excellent conversion to be obtained quite selectively over a considerable range of space velocities. Suitable space velocities are, for example, between about 300 and 3000 volumes of gaseous reactant (N. T. P.) per volume of catalyst per hour. A contact time affording the optimum results depends upon the particular material being dehydrogenated and the particular conditions chosen within the above given ranges and may best be determined for any given case by trial starting with a very short contact time and gradually increasing the contact time until the desired degree of conversion is obtained. The contact time in the dehydrogenation of butylenes and butadienes by way of example is preferably in the order of 0.02 to 0.5 second.

The catalyst may be used in any of the conventional forms such as pills, spheres, saddles, extrudates or irregular fragments of a shape and size adapted for the reaction system to be used. If desired, the process may be carried out in a so-called dust catalyst, fluidized catalyst or moving bed system. Excellent results may, however, be obtained by simply passing the preheated reactant vapors and preheated steam through a reaction chamber filled with the catalyst and maintained at the desired temperature and pressure. The steam in the product may be condensed and separated from the converted and unconverted material. The unconverted material may be separated from the product in conventional manners and recycled.

In many cases it is most advantageous to carry out the dehydrogenation in an intermittent manner, that is, to carry out the dehydrogenation in relatively short periods of, for instance, 1 to 8 hours with intermittent regeneration in the known manner. In such cases the regeneration may be effected by simply treating the catalyst with steam in the absence of the reactant for a short period at the reaction temperature. Certain of the catalysts, when employed under the described conditions, do not require such periodic regeneration and when these catalysts are employed the dehydrogenation may be advantageously carried out in a substantially continuous manner.

Example

A catalyst was prepared as follows: Baker's C. P. ferric oxide was slurried with 5.8% by weight of rubidium carbonate in aqueous solution. The slurry was evaporated to dryness while stirring. The mass was heated at 700° C. for 1 hour and then broken up into 8–20 mesh particles.

This catalyst was used for the dehydrogenation of a butylene fraction consisting of butene-1 and butene-2 under the following conditions:

Temperature_____° C__ 630
Pressure_____ 1 atm. at exit of catalyst bed
Gaseous hourly space velocity_____ 2000
Mol ratio, steam to butylene_____ 14:1

The steam and hydrocarbon were passed through the bed of catalyst for periods of 90 to 105 minutes and the catalyst was steamed for about 15 minutes under the same conditions between each process period. The following results were obtained:

| Cycle | Butylene reacted | Butylene converted to butadiene | Conversion efficiency |
|---|---|---|---|
| | Percent | Percent | Percent |
| 1 | 72 | 43.4 | 60.5 |
| 2 | 74 | 40.9 | 55 |
| 3 | 75 | 40.6 | 54 |

A catalyst prepared in the same manner using the same materials except that 4.4% of potassium nitrate was used instead of 5.8% of rubidium carbonate, when used at a space velocity of only 1000 (other conditions the same), gave the following results:

| Cycle | Butylene reacted | Butylene converted to butadiene | Conversion efficiency |
|---|---|---|---|
| | Percent | Percent | Percent |
| 2 | 73.5 | 34.3 | 46.5 |
| 4 | 69 | 35.7 | 52 |

It will be observed that by operating according to the process of the invention approximately 6% greater conversion to butadiene was obtained at twice the space velocity. This corresponds to increasing the production capacity of the reactor to about 230% of the normal.

Aside from the unexpectedly large increase in conversion and production capacity afforded, the present process has other important advantages. The prior-known catalysts containing potassium become deactivated during use at a relatively fast rate. Thus, prior-known catalysts are presently considered to be good if they sustain a 20% conversion to butadiene under the above conditions except at a gaseous hourly space velocity of 500 for 300 process hours. It has been determined that one of the causes of this deactivation is due to loss of potassium from the catalyst by volatilization. The rubidium in the catalysts used in the process of the present invention is relatively nonvolatile as compared to potassium and is volatilized from the catalyst at a much slower rate. This cause of decline in the activity of the catalyst is therefore substantially eliminated. Any small amount of rubidium volatilized in the process of the invention may be recovered and reused. Also, rubidium may be recovered from the spent catalyst by simple leaching treatment and reused in preparing fresh catalyst. Thus, although rubidium salts are relatively costly, the catalyst costs in the operation of the process of the invention are not expected to be increased appreciably and may, in fact, be lower.

I claim as my invention:

1. The process for the production of butadiene which comprises contacting a normal butylene in the presence of at least 2 mols of steam per mol of mono-olefin at a temperature above 580° C. at a gaseous hourly space velocity between about 300 and 3000 with a catalyst comprising a dehydrogenating oxide of iron promoted with rubidium in an amount equivalent to 0.9% and 5.5% by weight calculated as the oxide based on the dehydrogenating metal oxide of the catalyst.

2. The process for the production of butadiene which comprises contacting a normal butylene in the presence of at least 2 mols of steam per mol of mono-olefin at a temperature above 580° C. at a gaseous hourly space velocity between about 300 and 3000 with a catalyst comprising iron oxide and magnesia promoted with rubidium in an amount equivalent to 0.9% and 5.5% by weight calculated as the oxide based on the dehydrogenating metal oxide of the catalyst.

3. The process for the production of butadiene which comprises contacting a normal butylene in the presence of at least 2 mols of steam per mol of mono-olefin at a temperature above 580° C. adjusted to give a conversion to diolefin between 35% and 40% at a gaseous hourly space velocity between about 300 and 3000 with a catalyst comprising a dehydrogenating oxide of a metal of the first transition series promoted with rubidium in an amount equivalent to 0.9% and 5.5% by weight calculated as the oxide based on the dehydrogenating metal oxide of the catalyst.

4. The process for the production of butadiene which comprises contacting a normal butylene in the presence of at least 2 mols of steam per mol of mono-olefin at a temperature above 580° C. at a gaseous hourly space velocity between about 300 and 3000 with a catalyst comprising a dehydrogenating oxide of a metal of the first transition series promoted with a mixture of alkali metal oxides comprising potassium oxide, rubidium oxide and caesium oxide in an amount equivalent to 0.9% and 5.5% by weight calculated as the oxide based on the dehydrogenating metal oxide of the catalyst.

5. The process for the production of butadiene which comprises contacting a normal butylene in the presence of at least 2 mols of steam per mol of mono-olefin at a temperature above 580° C. at a gaseous hourly space velocity between about 300 and 3000 with a catalyst comprising a dehydrogenating oxide of a metal of the first transition series promoted with rubidium and potassium in an amount equivalent to 0.9% and 5.5% by weight calculated as the oxide based on the dehydrogenating metal oxide of the catalyst.

6. The process for the production of butadiene which comprises contacting a normal butylene in the presence of between about 7 and 14 mols of steam per mol of mono-olefin at a temperature above 580° C. at a gaseous hourly space velocity between about 300 and 3000 with a catalyst comprising a dehydrogenating oxide of a metal of the first transition series promoted with rubidium in an amount equivalent to 0.9% and 5.5% by weight calculated as the oxide based on the dehydrogenating metal oxide of the catalyst.

7. The process for the production of butadiene which comprises contacting a normal butylene in the presence of at least 2 mols of steam per mol of mono-olefin at a temperature above 580° C. at a gaseous hourly space velocity between about 300 and 3000 with a catalyst comprising a dehydrogenating oxide of a metal of the first transition series promoted with rubidium in an amount equivalent to 0.9% and 5.5% by weight calculated as the oxide based on the dehydrogenating metal oxide of the catlayst.

8. A process for the production of a diolefin which comprises contacting a mono-olefin having at least 4 and not more than 5 non-quaternary carbon atoms in a straight chain in the presence of at least 2 mols of steam per mol of mono-olefin at a temperature above 580° C. at a gaseous hourly space velocity between about 300 and 3000 with a catalyst comprising a dehydrogenating oxide of a metal of the first transition series promoted with a mixture of alkali metal oxides comprising potassium oxide, rubidium oxide and caesium oxide in an amount equivalent to 0.9% and 5.5% by weight calculated as the oxide based on the dehydrogenating metal oxide of the catalyst, and separating the diolefin from the reaction mixture.

9. A process for the production of a diolefin which comprises contacting a mono-olefin having at least 4 and not more than 5 non-quaternary carbon atoms in a straight chain in the presence of at least 2 mols of steam per mol of mono-olefin at a temperature above 580° C. adjusted to give a conversion to diolefin between 35% and 40% at a gaseous hourly space velocity between about 300 and 3000 with a catalyst comprising a dehydrogenating oxide of a metal of the first transition series promoted with rubidium in an amount equivalent to 0.9% and 5.5% by weight calculated as the oxide based on the dehydrogenating metal oxide of the catalyst, and separating the diolefin from the reaction mixture.

10. A process for the production of a diolefin which comprises contacting a mono-olefin having at least 4 and not more than 5 non-quaternary carbon atoms in a straight chain in the presence of at least 2 mols of steam per mol of mono-olefin at a temperature above 580° C. at a gaseous hourly space velocity between about 300 and 3000 with a catalyst comprising iron oxide and magnesia promoted with rubidium in an amount equivalent to 0.9% and 5.5% by weight calculated as the oxide based on the dehydrogenating metal oxide of the catalyst, and separating the diolefin from the reaction mixture.

11. A process for the production of a diolefin which comprises contacting a mono-olefin having at least 4 and not more than 5 non-quaternary carbon atoms in a straight chain in the presence of at least 2 mols of steam per mol of mono-olefin at a temperature above 580° C. at a gaseous hourly space velocity between about 300 and 3000 with a catalyst comprising an oxide of iron promoted with rubidium in an amount equivalent to 0.9% and 5.5% by weight calculated as the oxide based on the dehydrogenating metal oxide of the catalyst, and separating the diolefin from the reaction mixture.

12. A process for the production of a diolefin which comprises contacting a mono-olefin having at least 4 and not more than 5 non-quaternary carbon atoms in a straight chain in the presence of at least 2 mols of steam per mol of mono-olefin at a temperature above 580° C. and at a gaseous hourly space velocity between about 300 and 3000 with a catalyst comprising a dehydrogenating oxide of a metal of the first transition series promoted with rubidium and potassium in an amount equivalent to 0.9% and 5.5% by weight calculated as the oxide based on the dehydrogenating metal oxide of the catalyst, and separating the diolefin from the reaction mixture.

13. A process for the production of a diolefin which comprises contacting a mono-olefin having at least 4 and not more than 5 non-quaternary carbon atoms in a straight chain in the presence of between about 7 and 14 mols of steam per mol of mono-olefin at a temperature above 580° C. and at a gaseous hourly space velocity between about 300 and 3000 with a catalyst comprising a dehydrogenating oxide of a metal of the first transition series promoted with rubidium in an amount equivalent to 0.9% and 5.5% by weight calculated as the oxide based on the dehydrogenating metal oxide of the catalyst, and separating the diolefin from the reaction mixture.

14. A process for the production of a diolefin which comprises contacting a mono-olefin having at least 4 non-quaternary carbon atoms in a straight chain in the presence of at least 2 mols of steam per mol of mono-olefin at a temperature above 580° C. and at a gaseous hourly space velocity between about 300 and 3000 with a catalyst comprising a dehydrogenating oxide of a metal of the first transition series promoted with rubidium in an amount equivalent to 0.9% and 5.5% by weight calculated as the oxide based on the dehydrogenating metal oxide of the catalyst, and separating the diolefin from the reaction mixture.

KENNETH A. WRIGHT.